United States Patent
Meyer

(10) Patent No.: US 10,352,675 B2
(45) Date of Patent: Jul. 16, 2019

(54) LENGTH-MEASURING DEVICE HAVING A REMOVABLE TENSIONER FOR A SCALE TAPE

(71) Applicant: DR. JOHANNES HEIDENHAIN GmbH, Traunreut (DE)

(72) Inventor: Hermann Meyer, Schneizlreuth (DE)

(73) Assignee: DR. JOHANNES HEIDENHAIN GMBH, Traunreut (DE)

(*) Notice: Subject to any disclaimer, the term of this patent is extended or adjusted under 35 U.S.C. 154(b) by 15 days.

(21) Appl. No.: 15/641,332

(22) Filed: Jul. 5, 2017

(65) Prior Publication Data
US 2018/0031359 A1    Feb. 1, 2018

(30) Foreign Application Priority Data

Jul. 27, 2016   (EP) ..................... 16181430

(51) Int. Cl.
*G01B 3/10*   (2006.01)
*G01D 5/347*  (2006.01)

(52) U.S. Cl.
CPC ....... *G01B 3/1005* (2013.01); *G01D 5/34707* (2013.01)

(58) Field of Classification Search
CPC . G01B 3/008; G01G 3/12; G01G 3/06; G01G 3/02; G01D 5/347; G01D 5/34746; G01D 5/245
See application file for complete search history.

(56) References Cited

U.S. PATENT DOCUMENTS

| | | | | |
|---|---|---|---|---|
| 3,816,002 A | * | 6/1974 | Wieg | G01D 5/34707 33/707 |
| 4,057,904 A | * | 11/1977 | Vrabel | G01B 3/11 33/700 |
| 4,074,473 A | * | 2/1978 | Nelson | G01B 5/0014 368/182 |

(Continued)

FOREIGN PATENT DOCUMENTS

| | | |
|---|---|---|
| DE | 4320728 A1 | 1/1995 |
| EP | 0388453 A1 | 9/1990 |

(Continued)

*Primary Examiner* — Harshad R Patel
*Assistant Examiner* — Tran M. Tran
(74) *Attorney, Agent, or Firm* — Leydig, Voit & Mayer, Ltd.

(57) ABSTRACT

A length-measuring device for measuring a relative position of two objects with respect to each other by scanning a measuring graduation of a scale tape includes a hollow section member in which the scale tape is tensioned along a longitudinal direction of the hollow section member. A tensioner device is configured to tension the scale tape. The tensioner device includes a fixed member which is stationary relative to the hollow section member and a tensioner which is held under tension on the fixed member by a spring acting in the longitudinal direction, as well as a holding member to which the scale tape and the tensioner are attached. The tensioner is detachably secured to the holding member and configured such that the tensioner is separable from the holding member and removable from the hollow section member at an end. An adjuster adjusts the tension of the scale tape.

10 Claims, 5 Drawing Sheets

(56) References Cited

U.S. PATENT DOCUMENTS

| | | | | |
|---|---|---|---|---|
| 4,117,439 A * | 9/1978 | Azzani | G01B 3/002 | 336/129 |
| 4,170,826 A * | 10/1979 | Holstein | G01D 5/34761 | 33/702 |
| 4,308,666 A * | 1/1982 | Hahn | G01B 3/18 | 33/820 |
| 4,320,578 A * | 3/1982 | Ernst | G01B 3/002 | 33/484 |
| 4,532,709 A * | 8/1985 | Leumann | G01B 7/13 | 33/763 |
| 4,534,113 A * | 8/1985 | Holstein | G01B 5/0014 | 33/707 |
| 4,541,181 A | 9/1985 | Giacomello | | |
| 4,554,741 A * | 11/1985 | Affa | G01B 21/02 | 250/237 G |
| 4,584,773 A * | 4/1986 | Rieder | G01B 5/0014 | 250/237 G |
| 4,631,830 A * | 12/1986 | Rieder | G01D 5/34753 | 33/707 |
| 4,912,856 A * | 4/1990 | Ernst | G01B 5/0014 | 33/702 |
| 4,982,508 A * | 1/1991 | Nelle | G01B 5/0014 | 33/702 |
| 5,016,359 A * | 5/1991 | Nagaoka | G01D 5/347 | 33/645 |
| 5,063,685 A | 11/1991 | Morrison et al. | | |
| 5,189,807 A * | 3/1993 | Gustafsson | G01B 5/0014 | 33/702 |
| 5,253,430 A * | 10/1993 | Rieder | G01B 5/0014 | 33/702 |
| 5,488,782 A * | 2/1996 | Ochiai | G01D 5/145 | 33/706 |
| 5,511,321 A | 4/1996 | Nelle | | |
| 5,832,616 A * | 11/1998 | Fiedler | G01D 5/34707 | 33/706 |
| 6,446,350 B1 * | 9/2002 | Nelle | G05B 19/404 | 33/503 |
| 6,612,047 B1 * | 9/2003 | Mazgaj | G01D 11/02 | 33/702 |
| 6,701,634 B2 | 3/2004 | Henshaw et al. | | |
| 6,739,067 B2 * | 5/2004 | Muller | G01D 5/34769 | 33/703 |
| 6,742,274 B2 * | 6/2004 | Kawada | G01D 3/028 | 33/702 |
| 6,761,079 B2 * | 7/2004 | Tondorf | G01B 5/0002 | 73/866.5 |
| 6,769,195 B2 * | 8/2004 | Huber | F16C 29/00 | 33/706 |
| 6,772,531 B1 | 8/2004 | Henshaw et al. | | |
| 6,868,620 B2 * | 3/2005 | Sanoner | G01B 3/11 | 33/756 |
| 6,931,741 B2 * | 8/2005 | Nakamura | G01D 5/34707 | 33/306 |
| 6,933,492 B2 * | 8/2005 | Linnemann | G01D 5/30 | 250/231.13 |
| 7,096,595 B2 * | 8/2006 | Greubel | F16C 29/00 | 33/706 |
| 7,121,013 B2 * | 10/2006 | Herkt | G01B 3/002 | 33/551 |
| 7,121,015 B2 * | 10/2006 | Boge | B23Q 17/22 | 33/707 |
| 7,134,177 B2 * | 11/2006 | Tondorf | B23Q 3/186 | 29/464 |
| 7,143,523 B2 * | 12/2006 | Mauermann | G01D 5/34761 | 33/706 |
| 7,185,444 B2 * | 3/2007 | Falkinger | G01D 5/24442 | 33/706 |
| 7,449,677 B2 * | 11/2008 | Ng | G01D 5/347 | 250/231.13 |
| 7,511,479 B2 * | 3/2009 | Schuler | B60N 2/002 | 324/207.2 |
| 7,525,113 B2 * | 4/2009 | Pucher | G01D 5/24442 | 250/231.13 |
| 7,591,080 B2 * | 9/2009 | Fiedler | G01D 5/34746 | 33/700 |
| 7,601,945 B2 * | 10/2009 | Nagata | G01D 5/36 | 250/221 |
| 7,856,734 B2 * | 12/2010 | Affa | G01D 5/34753 | 33/706 |
| 8,234,792 B2 * | 8/2012 | Schenk | G01D 5/34761 | 33/706 |
| 8,448,345 B2 * | 5/2013 | Vidal | G01B 5/00 | 33/512 |
| 8,739,426 B1 * | 6/2014 | Freed | G01B 3/10 | 33/413 |
| 8,850,711 B2 * | 10/2014 | Schenk | G01D 5/34753 | 33/700 |
| 8,997,367 B2 * | 4/2015 | Schmoller | G01D 5/34761 | 33/706 |
| 8,997,368 B2 * | 4/2015 | Kummetz | G01D 5/24442 | 33/770 |
| 9,234,734 B2 * | 1/2016 | Schmoller | G01B 5/02 | |
| 9,303,980 B2 * | 4/2016 | Holzapfel | B23Q 3/18 | |
| 9,395,215 B2 * | 7/2016 | Motoyuki | G01D 5/34746 | |

FOREIGN PATENT DOCUMENTS

| | | |
|---|---|---|
| EP | 1111346 A2 | 6/2001 |
| EP | 1731878 A1 | 12/2006 |
| EP | 2325610 B1 | 11/2011 |

* cited by examiner

LENGTH-MEASURING DEVICE HAVING A REMOVABLE TENSIONER FOR A SCALE TAPE

CROSS-REFERENCE TO PRIOR APPLICATION

Priority is claimed to European Patent Application No. EP 16181430.6, filed on Jul. 27, 2016, the entire disclosure of which is hereby incorporated by reference herein.

FIELD

The present invention relates to a length-measuring device for measuring the relative position of two objects. The length-measuring device includes a hollow section member in which a scale tape is disposed under tension along its length, as well as a tensioning device for tensioning purposes.

BACKGROUND

EP 2 325 610 B1 describes a length-measuring device of the aforementioned type having a scale tape that is maintained tensioned in the longitudinal direction (which corresponds to the measurement direction). For tensioning the scale tape, a tension is provided at one of the two scale tape ends. The tensioning device includes a spring whose tensioning force is adjustable by means of a screw. The tensioning device is disposed in recessed relation with respect to the scale tape, so that the scanning unit can be moved out over and past the tensioning device at the end.

SUMMARY

In an embodiment, the present invention provides a length-measuring device for measuring a relative position of two objects with respect to each other by scanning a measuring graduation of a scale tape. The length-measuring device includes a hollow section member in which a scale tape is tensioned along a longitudinal direction of the hollow section member. A tensioner device is configured to tension the scale tape. The tensioner device includes a fixed member which is stationary relative to the hollow section member and a tensioner which is held under tension on the fixed member by a spring acting in the longitudinal direction, as well as a holding member to which the scale tape and the tensioner are attached. The tensioner is detachably secured to the holding member and configured such that the tensioner is separable from the holding member and removable from the hollow section member at an end. An adjuster is configured to adjust the tension of the scale tape.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
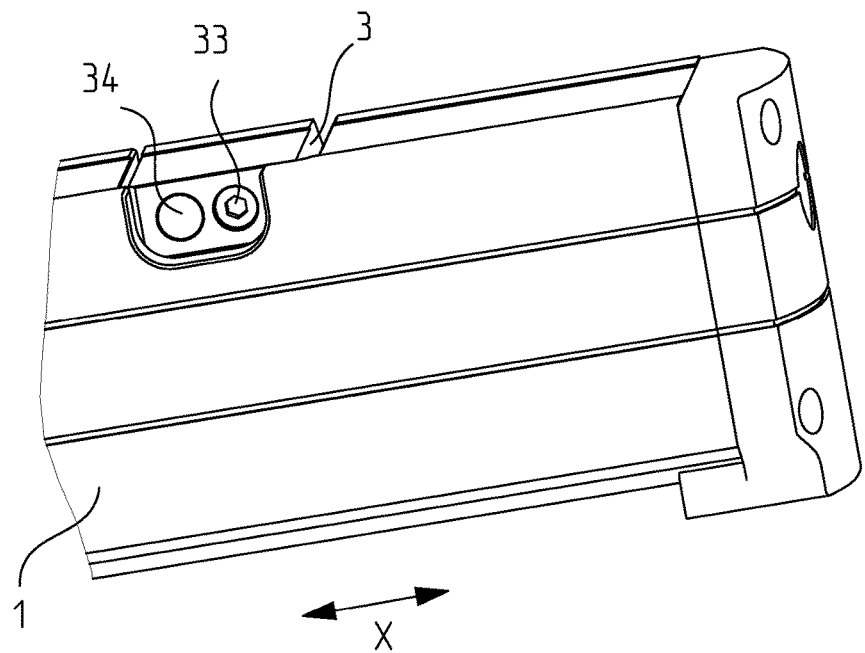
FIG. 1 is a perspective view of a length-measuring device designed in accordance with an embodiment of the present invention.
Figure 2:
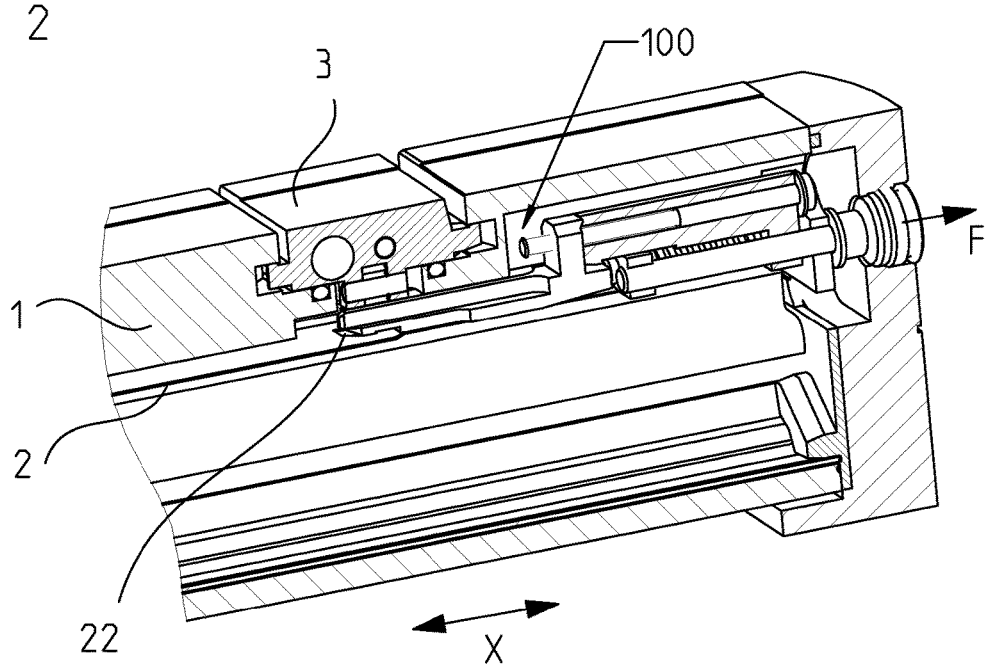
FIG. 2 is a longitudinal section of the length-measuring device of FIG. 1 with a first tensioning device designed in accordance with an embodiment of the present invention.

The inventor has recognized that, as a result of the recessed arrangement of the tensioning device in EP 2 325 610 B1, it is not possible to align the tensioning force with the scale tape and that the tensioning device exerts transverse forces on the scale tape which adversely affect the measuring accuracy.

In an embodiment, the present invention provides a length-measuring device that is easy to service and maintain and permits accurate position measurement.

According to an embodiment, the present invention makes it possible to stationarily mount the holding member and the scale tape attached thereto on a mounting block, and to subsequently remove the remainder of the tensioning device. In this connection, the tensioned condition of the scale tape remains as adjusted, and the scanning unit can be moved in the longitudinal direction over and past the scale tape and the holding member and out of the hollow section member at an end thereof. For this purpose, it is not necessary to mount the entire tensioning device in a recessed position such that the scanning unit can be moved out over and past the tensioning device at the end. Rather, it is sufficient if the holding member is configured so as not to be in the travel path of the scanning unit. To this end, the tensioning element is detachably secured to the holding member and configured such that it can be separated from the holding member and removed from the hollow section member at an end. "Removal at an end" means that it is removed from the hollow section member in longitudinal direction X so as to clear the space within the hollow section member to permit removal of the scanning unit.

Preferably, the mounting block is disposed on the hollow section member such that it is displaceable in the longitudinal direction; i.e., such that it is decoupled from the hollow section member.

An embodiment of the present invention also allows the spring means provided for tensioning the scale tape to be disposed such that its line of action extends in alignment with the scale tape.

It is advantageous for the tensioning device to have an intermediate element that is adjustable relative to the fixed member in the longitudinal direction by means of the adjusting means, the spring means exerting a spring force acting in the longitudinal direction from the intermediate element on the tensioning element.

Particularly suitable as an adjusting means is a screw which is configured and arranged such that the intermediate element is displaceable relative to the fixed member in the longitudinal direction by turning the screw.

In particular, the holding member is detachably secured to the tensioning element by a fastening means in the form of a screw configured and arranged such that the holding member is displaceable relative to the tensioning element in the longitudinal direction by turning the screw.

The screw forming the adjusting means and the screw forming the fastening means preferably extend in the longitudinal direction and are offset from each other in a direction perpendicular to the longitudinal direction.

The spring means that maintains the scale tape tensioned is preferably a coil spring in the form of a tension spring or a compression spring arranged to extend in the longitudinal direction. The spring means may also be composed of an array of multiple tension springs or multiple compression springs.

The length-measuring device has a mounting block, which is decoupled from the hollow section member in the longitudinal direction. The holding member, together with the scale tape attached thereto and maintained at the set tension, can be stationarily mounted on this mounting block. Thus, via the mounting block, the tensioned scale tape can be stationarily mounted directly on the object to be measured.

The stationary attachment of the holding member to the mounting block is preferably accomplished by clamping action.

A first exemplary embodiment of the present invention will now be described in greater detail with reference to FIGS. 1 through 7.

This length-measuring device is composed of a hollow section member 1 having a longitudinal slot covered by sealing means. The sealing means are preferably sealing lips arranged in a roof-like manner, which are per se known. Such length-measuring devices are also referred to as sealed length-measuring devices. During position measurement, a scanning unit is disposed within hollow section member 1 and attached to an object to be measured via a drive dog extending through the sealing lips and passing through the longitudinal slot. For purposes of position measurement, the drive dog of the scanning unit is mounted to a first object to be measured, and hollow section member 1 is mounted to a second object to be measured, which is movable relative to the first object to be measured in longitudinal direction X. Longitudinal direction X corresponds to the measurement direction.

In length-measuring devices, scale tapes 2 are used whose measuring graduation is deliberately manufactured with insufficient length so as to counteract thermal expansions. To enable measurement operation, scale tapes 2 are stretched to their nominal length in longitudinal direction X by spring force. Hollow section member 1 has provided therein a groove in which scale tape 2 is received in such a manner that it is form-fittingly locked in directions transverse to longitudinal direction X, but decoupled from hollow section member 1 in longitudinal direction X such that it can expand independently of hollow section member 1. Scale tape 2 carries the measuring graduation on its upper side; i.e., the side located opposite the scanning unit and facing the same. During measurement operation, the measuring graduation is scanned, preferably photoelectrically, by the scanning unit. In this process, the scanning unit generates position-dependent scanning signals.

Scale tape 2 is maintained tensioned along hollow section member 1 by providing that it is stationarily fixed at one end to the hollow section member 1 or, preferably directly to the object to be measured, and that it is tensioned at the other end by means of a tensioning device 100, and that, during measurement operation, it is fixed in this tensioned state directly to the object to be measured by means of a mounting block 3. The present invention concerns the construction of tensioning device 100 which, in the exemplary embodiment, is disposed at the right end of hollow section member 1. Therefore, the left end of hollow section member 1 is not shown in the figures.

Figure 3:
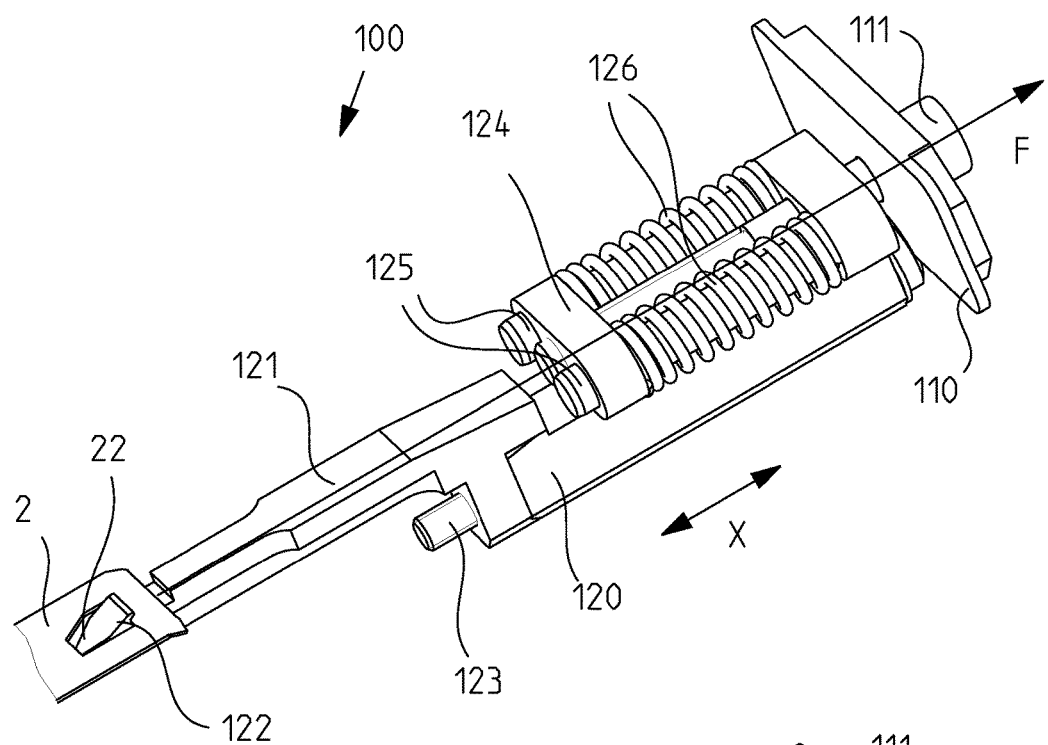
FIG. 3 is a perspective view showing the tensioning device of the length-measuring device of FIG. 2 in a first mounting position.
Figure 4:
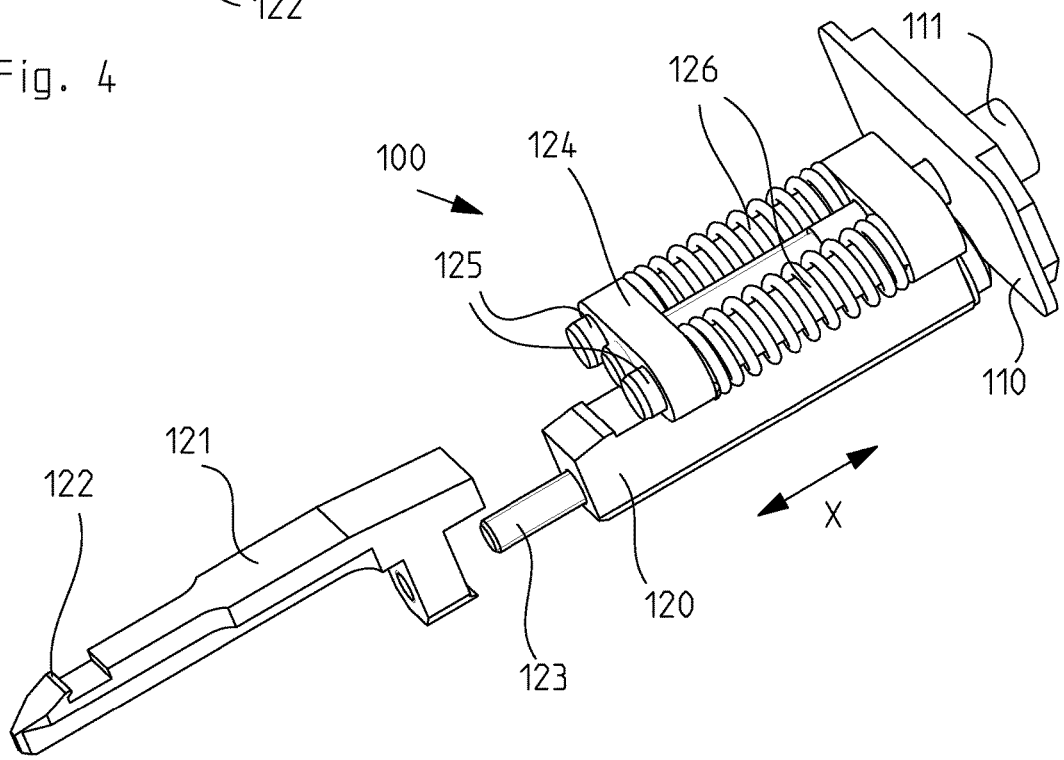
FIG. 4 is a perspective view showing the tensioning device in a second mounting position.
Figure 5:
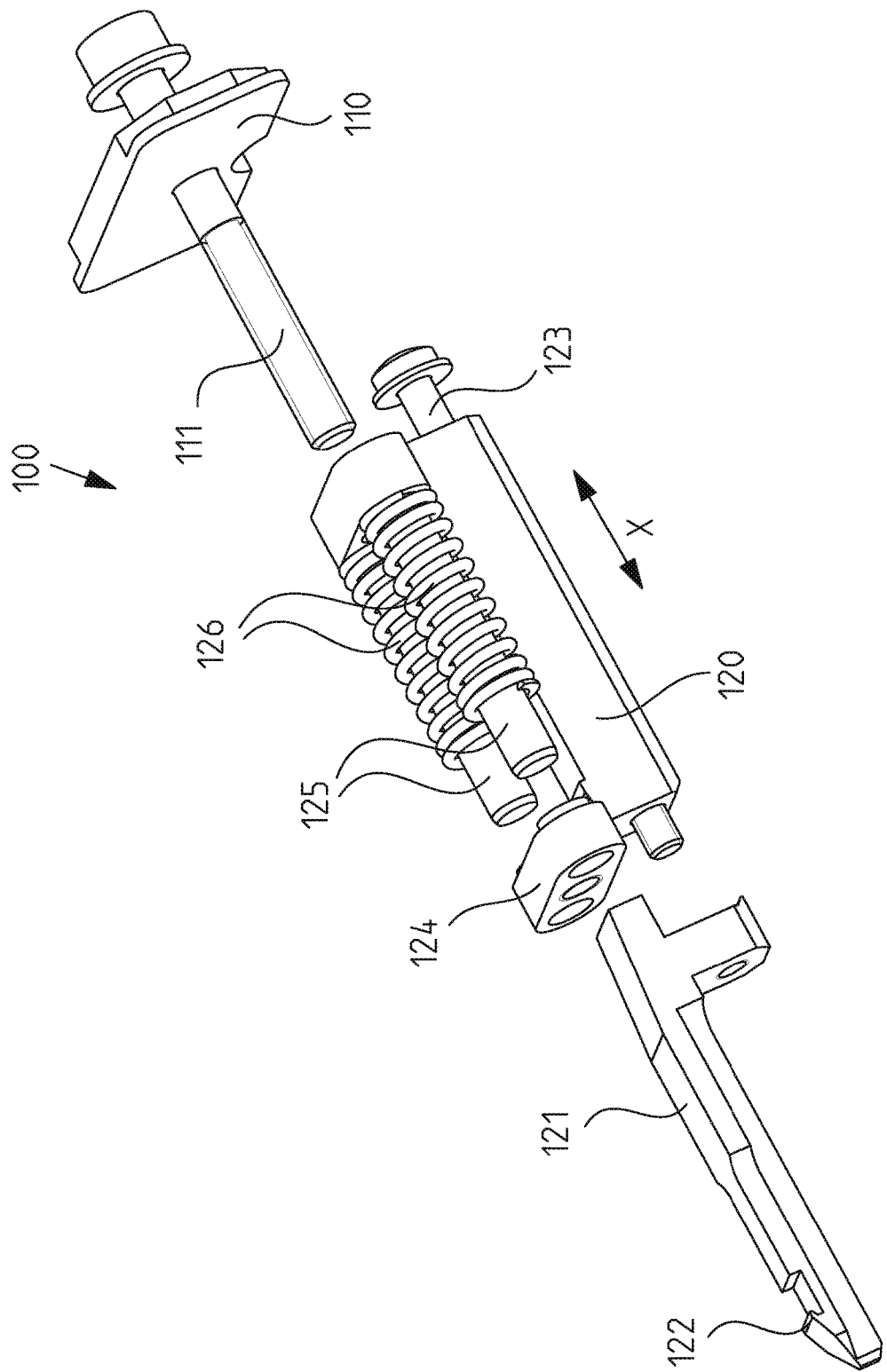
FIG. 5 is an exploded view of the tensioning device.

The tensioning device 100 designed in accordance with the first example is shown in detail in FIGS. 3 through 5 and will be described in more detail hereinafter. The tensioning device 100 for tensioning scale tape 2 includes a fixed member 110 and a tensioning element 120, which is secured to fixed member 110 under tension, and which has a holding portion to which scale tape 2 is attached. In accordance with the present invention, the holding portion is a holding member 121 which is separable from tensioning element 120, the tensioning element 120 and the holding member 121 being separable from one another. In the exemplary embodiment shown, scale tape 2 is attached to holding member 121 with a form fit created by engagement of a hook-shaped pulling dog 122 in an opening 22 of scale tape 2.

Tensioning element 120 is attached to fixed member 110 by an adjusting means 111 for adjusting the tension of scale tape 2. Holding member 121 is detachably secured to tensioning element 120 by a fastening means 123, which can be operated independently of adjusting means 111. In the exemplary embodiment, fastening means 123 is a screw which is supported on tensioning element 120 and by which holding member 121 can be screwed to tensioning element 120.

Tensioning device 100 includes an intermediate element 124 which is displaceable relative to tensioning element 120 in longitudinal direction X by adjusting means 111. A spring means 126, which, in this example, is composed of two compression springs, is disposed between tensioning element 120 and intermediate element 124. Intermediate element 124 can be displaced relative to tensioning element 120 in longitudinal direction X by adjusting means 111, whereby the spring force with which tensioning element 120 is disposed on fixed member 110 can be varied, thereby making it possible to vary the tension F acting on scale tape 2. Intermediate element 124 is guided longitudinally in a defined manner via a guide 125 on tensioning element 120. In this example, this guide 125 is formed by two guide pins.

Adjusting means 111 is a screw which is supported in longitudinal direction X on fixed member 110 and which, when turned, displaces intermediate element 124 relative to fixed member 110 in longitudinal direction X.

Preferably, spring means 126 is spatially arranged such that the line of action of the tension F generated by it extends in the plane of scale tape 2, in particular in alignment with scale tape 2, which is tensioned in longitudinal direction X.

Fixed member 110 is disposed on hollow section member 1 such that it is fixed in longitudinal direction X, for example by a form fit. In the exemplary embodiment, fixed member 110 is supported on a surface of hollow section member 1 extending in a direction transverse to longitudinal direction X, and counteracts tensioning force F.

Figure 6:
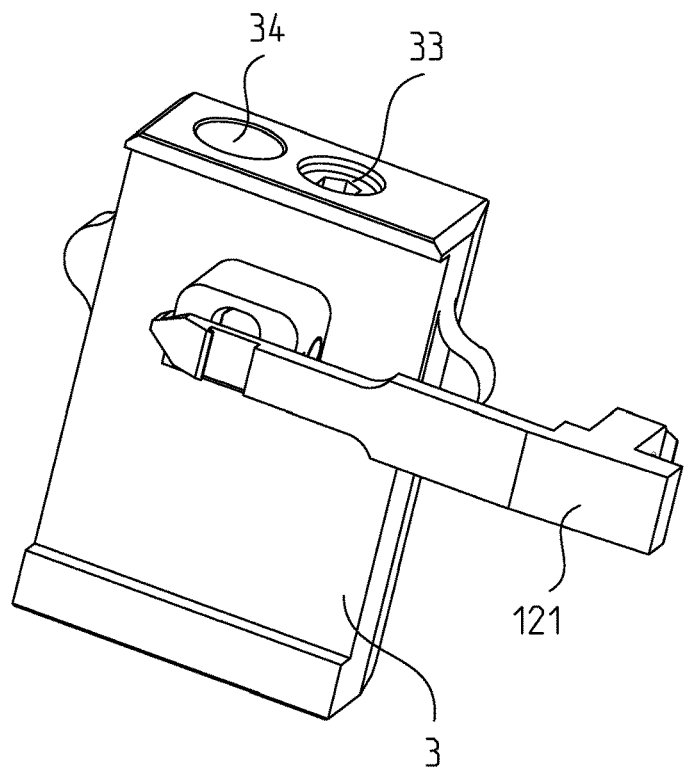
FIG. 6 is a perspective view of the mounting block.
Figure 7:
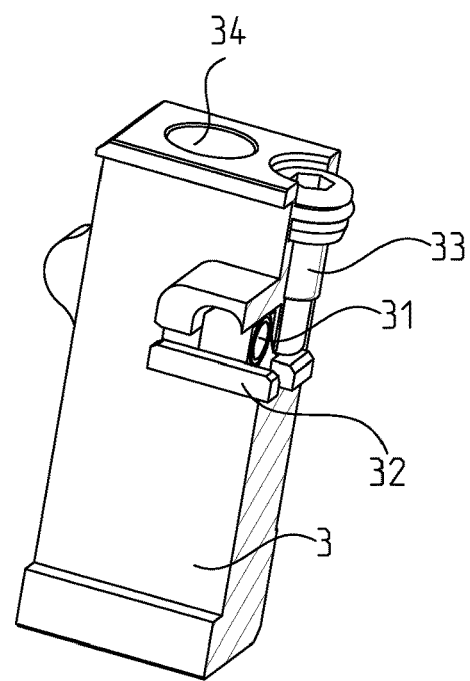
FIG. 7 is a cross-sectional view of the mounting block of FIG. 6.

Holding member 121 can be fixed in longitudinal direction X on mounting block 3. In the exemplary embodiment, fixed attachment of holding member 121 to mounting block 3 is achieved by clamping action. FIGS. 6 and 7 show mounting block 3 with the clamping mechanism. The clamping mechanism is composed of a lever 32 rotatable about a pivot 31. The turning of lever 32, and thus the clamping of holding member 121 to mounting block 3, is initiated by a clamping screw 33.

Mounting block 3 is disposed on hollow section member 1 such that it is displaceable in longitudinal direction X; i.e., such that it is decoupled from hollow section member 1 in longitudinal direction X. Prior to the actual measurement operation, using tensioning device 100, the desired tension of scale tape 2 is set by operating the adjusting means 111. During this adjustment operation, holding member 121 is not fixedly attached to mounting block 3. After the desired tension has been set, hollow section member 1 and mounting block 3 are mounted to one of the objects to be measured. To this end, mounting block 3 is provided with a bore 34 extending in a direction transverse to longitudinal direction X and allowing mounting block 3 to be stationarily fixed by a screw to the object to be measured. After attachment is complete, the end of scale tape 2 is fixed to mounting block 3 via holding member 121, and thus to the object to be measured, bypassing hollow section member 1. To this end, holding member 121 is stationarily mounted to mounting block 3 by clamping action.

As a result of a space-saving design of the length-measuring device, at least a portion of tensioning device 100 is disposed in the travel path of the scanning unit and hinders the scanning unit from being moved out at the end. The tensioning device 100 designed in accordance with the present invention now makes it possible to separate tensioning element 120 from holding member 121. During this process, mounting block 3 is attached to the object to be measured, and holding member 121, and thus scale tape 2, is attached to mounting block 3. During the separation process, tensioning element 120 is removed from holding member 121 using fastening means 123. In the process, spring means 126 relaxes until it contacts fixed member 110. Tensioning device 100 can now be taken out of hollow section member 1 at the end without holding member 121 and removed from the travel path of the scanning unit, so that the scanning unit can be moved out over and past holding member 121 at the end. The scanning unit so removed may be replaced with a new one. After this new scanning unit has been moved into hollow section member 1, tensioning device 100 is reinstalled by connecting fixed member 110 to hollow section member 1 and by connecting tensioning element 120 to holding member 121. As fastening means 123 is screwed into holding member 121, spring means 126 is retensioned in the same way as prior to its removal, so that the previously set tension is exerted on scale tape 2.

As described earlier herein, the present invention concerns the embodiment of the length-measuring device in the right portion thereof, which is why the left end has not been illustrated. Advantageously, scale tape 2 is fixed directly to the object to be measured via a mounting block at the end opposite the tensioning device 100 (here the left end). Since scale tape 2 is rigidly attached to mounting block 3 in longitudinal direction X by means of holding member 121, and because mounting block 3 is, in turn, stationarily mounted to the object to be measured, the entire scale tape 2 is held under tension directly on the object to be measured. Changes in the length of the object to be measured (generally a machine part of a machine tool) which are caused by temperature changes are transmitted directly to scale tape 2. Since the left mounting block and the right mounting block 3 are decoupled from hollow section member 1, no constraining forces are transmitted to scale tape 2 from hollow section member 1, which is generally made of aluminum.

Figure 8:
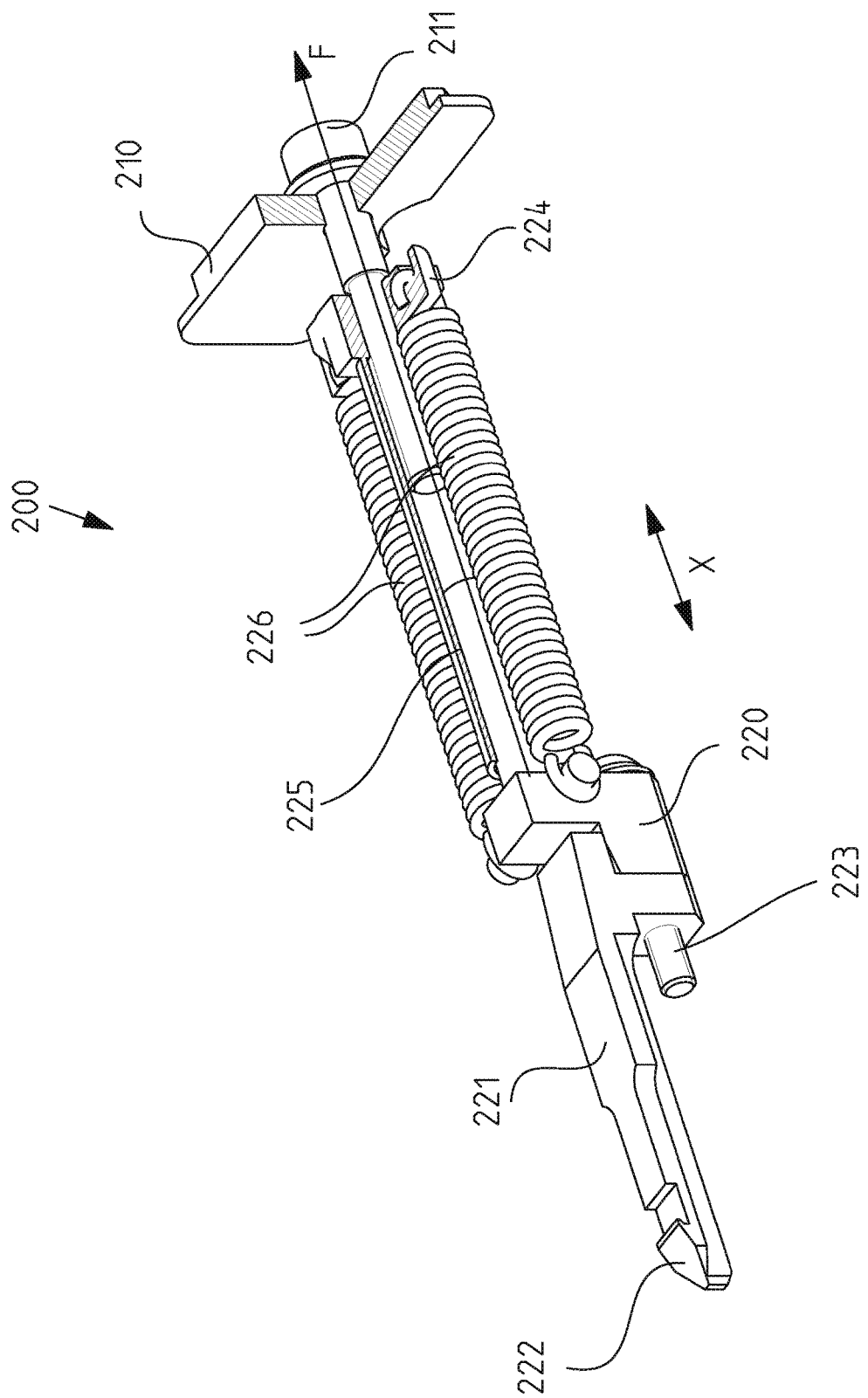
FIG. 8 is a view of a second tensioning device according to an embodiment of the present invention.

An alternative embodiment of a tensioning device 200 will now be described in more detail with reference to FIG. 8. This tensioning device 200 cooperates with scale tape 2, hollow section member 1 and mounting block 3 in the same way as tensioning device 100. For the sake of clarity, hollow section member 1, scale tape 2 and mounting block 8 are not shown in FIG. 8.

This tensioning device 200 for tensioning scale tape 2 also includes a fixed member 210 and a tensioning element 220 held thereto by a spring means 226 acting in longitudinal direction X. A holding member 221 is detachably secured to tensioning element 220. The design of this holding member 221 may correspond to that of the first exemplary embodiment. Scale tape 2 is held on holding member 221 by a hook-shaped pulling dog 222 formed thereon. The tension of spring means 226 is adjustable by an adjusting means 211. Tensioning element 220 is detachable from holding member 221 by a fastening means 223, which can be operated independently of adjusting means 211.

Tensioning device 200 further includes an intermediate element 224 that is adjustable relative to fixed member 210 in longitudinal direction X using adjusting means 211. In this exemplary embodiment, spring means 226 is formed by two tension springs which exert a spring force acting in longitudinal direction X from intermediate element 224 on tensioning element 220. Here too, a guide 225 is provided for guiding intermediate element 224 longitudinally in a defined manner relative to tensioning element 220.

The two exemplary embodiments have in common that the holding portion on which scale tape 2 is held is designed as a holding member 121, 221 that is separable from tensioning element 120, 220. The separation point is designed to allow reproducible connection subsequent to separation. For this purpose, in the examples, tensioning element 120, 220 and holding member 121, 221 each provide an abutment surface for a defined form fit effective in longitudinal direction X.

The position of intermediate element 124, 224 relative to fixed member 110, 210 that has been set prior to separation is maintained upon separation, so that the thereby set spring force acting on scale tape 2 is restored after reconnecting holding member 121, 221 and tensioning element 120, 220. In accordance with the present invention, the tension F of scale tape 2 set prior to separation is automatically restored upon reconnection.

In both exemplary embodiments, only holding member 121, 221 needs to be designed so as to be disposed out of the travel path of the scanning unit. The remaining parts of tensioning device 100, 200 can be taken out of the hollow section member at the end without holding member 121, 221 and removed from the travel path of the scanning unit, so that the scanning unit can be moved out over and past holding member 121, 221 at the end.

In both exemplary embodiments, tensioning device 100, 200 can now be easily configured and arranged such that the line of action of spring means 126, 226 extends in the plane of scale tape 2, in particular in alignment with the scale tape.

In all exemplary embodiments, it is particularly advantageous if scale tape 2 and mounting block 3 are made of identical material, in particular of the same material as the machine part to which mounting block 3 is mounted. In most cases, the machine part is made of steel. In these cases, mounting block 3 should also be made of steel, and scale tape 2 should be a steel tape.

As explained earlier, the second exemplary embodiment differs from the first exemplary embodiment by spring means 126, 226. For comparable spring constants and spring tensions F to be applied, tensioning device 100 permits a shorter design in longitudinal direction X than tensioning device 200.

The present invention may also be advantageously used in length-measuring devices where hollow section member 1 is composed of a plurality of sections abutting against one another. In this case, scale tape 2 is tensioned across this plurality of sections.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A length-measuring device for measuring a relative position of two objects with respect to each other by scanning a measuring graduation of a scale tape, the length-measuring device comprising:
    a hollow section member in which the scale tape is tensioned along a longitudinal direction of the hollow section member; and
    a tensioner device configured to tension the scale tape, the tensioner device comprising:
        a fixed member which is fixed to the hollow section member and a tensioner which is held under tension on the fixed member by a spring acting in the longitudinal direction, wherein a line of action of the spring extends in alignment with the scale tape along the longitudinal direction of the hollow section member;
        a holding member, wherein the scale tape is attached to the holding member, and wherein the tensioner is detachably secured to the holding member using a fastener such that the tensioner is separable from the holding member and removable from the hollow section member at an end by disconnecting the fastener;
        an adjuster configured to adjust the tension of the scale tape.

2. The length-measuring device as recited in claim 1, wherein the tensioner device includes an intermediate element that is adjustable relative to the fixed member in the longitudinal direction using the adjuster, and wherein the spring exerts a spring force acting in the longitudinal direction from the intermediate element on the tensioner.

3. The length-measuring device as recited in claim 2, wherein the adjuster is a screw which is configured and arranged such that the intermediate element is displaceable relative to the fixed member in the longitudinal direction by turning the screw.

4. The length-measuring device as recited in claim 1, wherein the fastener is in the form of a screw configured and arranged such that the holding member is displaceable relative to the tensioning element in the longitudinal direction by turning the screw.

5. The length-measuring device as recited in claim 4, wherein the adjuster is comprises a screw, wherein the tensioner device includes an intermediate element that is adjustable relative to the fixed member in the longitudinal direction using the adjuster, wherein the spring exerts a spring force acting in the longitudinal direction from the intermediate element, and wherein the screw of the adjuster and the screw forming the fastener extend in the longitudinal direction and are offset from each other in a direction perpendicular to the longitudinal direction.

6. The length-measuring device as recited in claim 1, wherein the spring includes at least one coil spring in the form of a tension spring or a compression spring arranged to extend in the longitudinal direction.

7. The length-measuring device as recited in claim 1, wherein a mounting block is disposed on the hollow section member such that the mounting block is displaceable in the longitudinal direction relative to the hollow section member, and wherein the holding member, together with the scale tape secured thereto, is stationarily mountable on the mounting block.

8. The length-measuring device as recited in claim 7, wherein the holding member is fixable on the mounting block by clamping action.

9. The length-measuring device according to claim 1, wherein the holding member is configured such that a scanning unit for scanning the measuring graduation of the scale tape is moveable out of the end of the hollow section member over and past the holding member.

10. A method of forming a length-measuring device for measuring a relative position of two objects with respect to each other by scanning a measuring graduation of a scale tape, the method comprising:
    providing a hollow section member and a tensioner device, the tensioner device comprising a fixed member, a holding member, a tensioner and an adjuster, the fixed member being fixed to the hollow section member and the tensioner being held under tension on the fixed member by a spring acting in a longitudinal direction of the hollow section member, the scale tape being attached to the holding member, the adjuster being configured to adjust a tension of the scale tape; and
    detachably securing the tensioner to the holding member using a fastener such that the tensioner is separable from the holding member and removable from the hollow section member at an end by disconnecting the fastener, whereby the scale tape is tensioned in the hollow section member along the longitudinal direction with a line of action of the spring extending in alignment with the scale tape.

* * * * *